United States Patent
Aoki

(10) Patent No.: US 9,597,660 B2
(45) Date of Patent: Mar. 21, 2017

(54) CATALYTIC CONVERTER

(71) Applicant: TOYOTA JIDOSHA KABUSHIKI KAISHA, Toyota-shi, Aichi-ken (JP)

(72) Inventor: Yuki Aoki, Seto (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/912,967

(22) PCT Filed: Aug. 12, 2014

(86) PCT No.: PCT/IB2014/001506
§ 371 (c)(1),
(2) Date: Feb. 19, 2016

(87) PCT Pub. No.: WO2015/025200
PCT Pub. Date: Feb. 26, 2015

(65) Prior Publication Data
US 2016/0199812 A1 Jul. 14, 2016

(30) Foreign Application Priority Data
Aug. 22, 2013 (JP) .................... 2013-172137

(51) Int. Cl.
*B01J 23/00* (2006.01)
*B01J 23/10* (2006.01)
(Continued)

(52) U.S. Cl.
CPC ............ *B01J 23/10* (2013.01); *B01D 53/945* (2013.01); *B01J 23/002* (2013.01); *B01J 23/63* (2013.01);
(Continued)

(58) Field of Classification Search
CPC .... B01J 23/10; B01J 35/0006; B01J 37/0018; B01J 35/04; B01J 37/0244; B01J 23/63;
(Continued)

(56) References Cited

U.S. PATENT DOCUMENTS

| 2001/0006934 A1* | 7/2001 | Kachi | B01D 53/945 502/325 |
| 2006/0270550 A1* | 11/2006 | Shimizu | B01D 53/945 502/325 |
| 2009/0197764 A1 | 8/2009 | Yamato et al. | |

FOREIGN PATENT DOCUMENTS

| JP | 2008-023451 A | 2/2008 | |
| JP | WO 2011081219 A2 * | 7/2011 | ........... B01D 53/945 |

(Continued)

*Primary Examiner* — Colleen Dunn
*Assistant Examiner* — Haytham Soliman
(74) *Attorney, Agent, or Firm* — Sughrue Mion, PLLC

(57) ABSTRACT

A catalytic converter (10) includes a base material and a catalyst layer (3). The catalyst layer has a lower catalyst layer (4) and an upper catalyst layer (5). The upper catalyst layer is constituted by a first upper catalyst layer (6) and a second upper catalyst layer (7). The first upper catalyst layer is formed of a first carrier, which is formed of a ceria-containing oxide, and rhodium supported on the first carrier. The second upper catalyst layer is formed of a second carrier and rhodium supported on the second carrier. The second carrier does not contain ceria and is formed of one oxide selected from among zirconia and alumina. A length of the first upper catalyst layer is X % (30 to 70%) of an overall length of the base material. A length of the second upper catalyst layer is 100−X % of the overall length of the base material.

1 Claim, 4 Drawing Sheets

(51) Int. Cl.
  *B01D 53/94*   (2006.01)
  *B01J 37/02*   (2006.01)
  *B01J 23/63*   (2006.01)
  *B01J 35/04*   (2006.01)
  *B01J 37/00*   (2006.01)
  *B01J 35/00*   (2006.01)

(52) U.S. Cl.
  CPC ........... *B01J 35/0006* (2013.01); *B01J 35/04* (2013.01); *B01J 37/0018* (2013.01); *B01J 37/0244* (2013.01); *B01J 37/0248* (2013.01); *B01J 2523/00* (2013.01); *Y02C 20/10* (2013.01); *Y02T 10/22* (2013.01)

(58) Field of Classification Search
  CPC .. B01J 23/002; B01J 37/0248; B01J 2523/00; B01D 53/945; Y02T 10/22; Y02C 20/10
  USPC ........................................................ 502/303
  See application file for complete search history.

(56) References Cited

FOREIGN PATENT DOCUMENTS

| | | |
|---|---|---|
| JP | 2012-020276 A | 2/2012 |
| JP | 2012-040547 A | 3/2012 |
| JP | 2012-152702 A | 8/2012 |
| JP | 2013-091041 A | 5/2013 |
| WO | 2011/081219 A2 | 7/2011 |
| WO | 2012/101505 A1 | 8/2012 |

* cited by examiner

CATALYTIC CONVERTER

BACKGROUND OF THE INVENTION

1. Field of the Invention

This invention relates to a catalytic converter that is housed and fixed in a pipe that constitutes an exhaust gas discharge system.

2. Description of Related Art

A variety of efforts to reduce the burden on the environment are being made on a global scale in a number of industries. Of these, within the automotive industry, it goes without saying that gasoline-engine vehicles exhibiting excellent fuel economy are being developed, and the popularization of so-called eco-cars, as well as developments into further improving the performance of these eco-cars, are progressing on a daily basis. Examples of eco-cars include hybrid vehicles and electric vehicles. In addition to developments relating to such eco-cars, research into exhaust gas control catalysts, which control exhaust gases emitted by engines, is being actively carried out. Examples of these exhaust gas control catalysts include oxidation catalysts, three-way catalysts and NOx occlusion/reduction catalysts. The component that realizes the catalytic activity in these exhaust gas control catalysts is a noble metal catalyst such as platinum (Pt), palladium (Pd) or rhodium (Rh). Noble metal catalysts are generally used by being supported on a carrier consisting of a porous oxide such as alumina ($Al_2O_3$).

Exhaust gas discharge systems leading from a vehicle engine to a muffler generally include a catalytic converter used to purify exhaust gases. Engines may emit environmentally harmful substances, such as CO, NOx, unburned HCs and VOCs. In order to convert these harmful substances into acceptable substances, exhaust gases are passed through a catalytic converter obtained by disposing a catalyst layer, which is obtained by supporting a noble metal catalyst such as Rh, Pd or Pt on a carrier, on the surface of cells in a base material. CO present in the exhaust gas that passes through the catalytic converter is converted into $CO_2$, NOx present in the exhaust gas are converted into $N_2$ and $O_2$, and VOCs present in the exhaust gas are burned to produce $CO_2$ and $H_2O$.

An example of a carrier used to support a noble metal catalyst is a $CeO_2$—$ZrO_2$ solid solution. $CeO_2$—$ZrO_2$ solid solutions are available as CZ materials or cerium oxide (ceria)-zirconia-based complex oxides. These are also available as co-catalysts. $CeO_2$ is an essential component of three-way catalysts that simultaneously remove CO, NOx and HCs, which are harmful components present in exhaust gases, and is also an essential component of these co-catalysts. The oxidation number of Ce present in a co-catalyst changes to $Ce^{3+}$ or $Ce^{4+}$ depending on the oxygen partial pressure in the exhaust gas to which the $CeO_2$ is exposed. Therefore, $CeO_2$ present in a co-catalyst achieves the function of absorbing and releasing oxygen so as to compensate for an excess or deficiency of electrical charge and the function of storing oxygen (oxygen storage capacity (OSC)). Therefore, $CeO_2$ can absorb and alleviate fluctuations in the atmosphere of an exhaust gas and can maintain an air-fuel ratio close to the stoichiometric air-fuel ratio in order to maintain the purification window of a three-way catalyst.

From perspectives such as reducing material risks of rare metals and the like and ensuring cost competitiveness, it is desirable to reduce the usage quantity of noble metal catalysts in such three-way catalysts. However, if the quantity of noble metal catalysts in a three-way catalyst is greatly reduced, catalyst activity is greatly reduced and OSC, low temperature activity and NOx purification performance in high temperature environments significantly deteriorate. That is, if the quantity of noble metal catalysts is greatly reduced, the number of active sites is greatly reduced, the number of catalytic reaction sites is greatly reduced, and purification performance therefore significantly deteriorates.

Among noble metal catalysts used in three-way catalysts, such as Pt, Pd and Rh, Rh exhibits the best NOx purification performance, but the market price per unit weight of Rh is the highest. In addition, it is understood that Rh exhibits a high OSC by being supported on a carrier that contains cerium oxide (ceria). Meanwhile, it is understood that there is a conflict whereby the NOx purification performance of Rh deteriorates as the quantity of cerium oxide in a carrier increases. Therefore, when using Rh as a noble metal catalyst in a three-way catalyst, it is desirable to produce a three-way catalyst in which both OSC and NOx purification performance are optimized.

The performance of a noble metal catalyst and carrier varies depending on the components used. Therefore, with regard to producing optimal three-way catalysts, diligent research has been carried out into zone-coated catalysts in which different components are provided on the upstream side and downstream side of a base material so as to effectively utilize the properties of each component.

Japanese Patent Application Publication No. 2012-040547 (JP 2012-040547 A) relates to such a zone-coated catalyst and discloses an exhaust gas purifying catalyst that has a base material, which forms a gas passage where an exhaust gas flows, and a catalyst layer formed on the base material. More specifically, the catalyst layer is constituted by a lower catalyst layer, a front upper catalyst layer and a rear upper catalyst layer. The lower catalyst layer is formed on the base material. The front upper catalyst layer covers the upstream side of the surface of the lower catalyst layer in the exhaust gas flow direction. The rear upper catalyst layer covers the surface of the lower catalyst layer further to the downstream side, in the direction of gas flow, than the front upper catalyst layer. The lower catalyst layer supports at least one of Pd and Pt, the rear upper catalyst layer supports Rh, and the front upper catalyst layer supports Pd. The Pd-supporting carrier of the front upper catalyst layer is a $Y_2O_3$-containing $ZrO_2$ complex oxide. By using this configuration, it is possible to satisfactorily utilize the purification characteristics of the catalytic noble metals and also possible to increase the low temperature purification performance of the catalyst. In addition, by using a $Y_2O_3$-containing $ZrO_2$ complex oxide, which has a low specific heat capacity and exhibits excellent heat resistance, as the carrier material for the front upper catalyst layer, it is possible to ensure heat resistance while improving the temperature increase properties of the catalyst and also possible to achieve sustainable catalyst warm-up properties.

Meanwhile, Japanese Patent Application Publication No. 2012-152702 (JP 2012-152702 A) discloses an exhaust gas cleaning catalyst that has a substrate, a lower catalyst layer, which is formed on the substrate and contains at least one of Pd and Pt, and an upper catalyst layer, which is formed on the lower catalyst layer and contains Rh. The exhaust gas upstream side of the exhaust gas cleaning catalyst has a region that does not include the upper catalyst layer. The lower catalyst layer consists of a front lower catalyst layer on the exhaust gas upstream side and a rear lower catalyst layer on the exhaust gas downstream side. The front lower catalyst layer includes an oxygen absorbing/releasing material. By using this configuration, it is possible to significantly inhibit particle growth by each of the catalyst metals supported in each of the catalyst layers, and particularly in the rear lower catalyst layer and upper catalyst layer that are on the exhaust gas downstream side. Furthermore, by providing a region in which the upper catalyst layer is not included in the exhaust gas upstream side, it is possible to increase the diffusibility of HCs into the interior of the front lower catalyst layer and also possible to promote HC purification in the front lower catalyst layer and therefore achieve satisfactory catalyst warm-up performance.

Furthermore, Japanese Patent Application Publication No. 2012-020276 (JP 2012-020276 A) discloses an exhaust gas purification catalyst in which a catalyst layer that constitutes the exhaust gas purification catalyst is constituted by a lower catalyst layer, a front upper catalyst layer and a rear upper catalyst layer. The lower catalyst layer is formed on a substrate. The front upper catalyst layer covers the upstream side of the surface of the lower catalyst layer in the exhaust gas flow direction. The rear upper catalyst layer covers the surface of the lower catalyst layer further to the downstream side, in the direction of gas flow, than the front upper catalyst layer. Here, the lower catalyst layer supports at least one of Pd and Pt. In addition, the front upper catalyst layer supports Pd and the rear upper catalyst layer supports Rh. The Pd bearing density in the front upper catalyst layer is 4.5 to 12 mass %. By using this configuration, it is possible to satisfactorily utilize the catalytic characteristics of the catalytic noble metals and also possible to increase the low temperature purification performance of the catalyst.

As shown above, many features relating to zone-coated catalysts exist. However, the inventors of this invention re-examined the configuration of zone-coated catalysts and succeeded in proposing a catalytic converter that exhibits excellent OSC performance and NOx purification performance.

SUMMARY OF THE INVENTION

This invention provides a catalytic converter that exhibits excellent OSC performance and NOx purification performance.

A catalytic converter according to an aspect of the invention includes a base material and a catalyst layer. The base material has a cellular structure through which exhaust gases flow. The catalyst layer is formed on a surface of a cell wall in the base material. The catalyst layer has a lower catalyst layer and an upper catalyst layer. The lower catalyst layer is provided on a surface of the base material along an entire length of the base material. The upper catalyst layer is constituted by a first upper catalyst layer and a second upper catalyst layer. The first upper catalyst layer is formed on an upstream side of a surface of the lower catalyst layer in a direction of exhaust gas flow. An upstream side end of the base material is a starting point of the first upper catalyst layer. The second upper catalyst layer is formed on a downstream side of the surface of the lower catalyst layer in the direction of the exhaust gas flow. A downstream side end of the base material is a starting point of the second upper catalyst layer. The lower catalyst layer is formed of a carrier and palladium supported on the carrier. The first upper catalyst layer is formed of a first carrier, which is formed of a ceria-containing oxide, and rhodium supported on the first carrier. The second upper catalyst layer is formed of a second carrier and rhodium supported on the second carrier, the second carrier being formed of one oxide selected from among zirconia and alumina and not containing ceria. A length of the first upper catalyst layer in the direction of the exhaust gas flow is 30 to 70% of an overall length of the base material. A length of the second upper catalyst layer in the direction of the exhaust gas flow is a length obtained by subtracting the length of the first upper catalyst layer from the overall length of the base material.

In a catalytic converter that is an aspect of this invention, a zone-coated catalyst is used as a catalyst layer formed on a cell wall of a base material having a cellular structure. In addition, a lower catalyst layer is provided on the surface of the base material along the entire length thereof. In addition, a catalyst layer having a two-layer structure is formed in this aspect of this invention by laminating an upper catalyst layer on the surface of the lower catalyst layer. A first upper catalyst layer is formed on the upstream side of the base material in the direction of exhaust gas flow, and a second upper catalyst layer is formed on the downstream side of the base material in the direction of exhaust gas flow. That is, a zone-coated catalyst layer is used in the upper catalyst layer in the catalyst layer having a two-layer structure. The first upper catalyst layer has a first carrier formed of a ceria-containing oxide. The second upper catalyst layer has a second carrier formed of one oxide selected from among zirconia and alumina. The first carrier and the second carrier each support rhodium. Furthermore, by setting the length of the first upper catalyst layer to be 30 to 70% of the overall length of the base material, it is possible to obtain a catalytic converter having excellent OSC performance and NOx purification performance. In this aspect of this invention, the first carrier may be formed of a ceria-containing zirconia complex oxide and the second carrier may be formed of a zirconia complex oxide that does not contain ceria.

As mentioned above, the first upper catalyst layer and second upper catalyst layer in this aspect of this invention are carriers on which rhodium is supported as a noble metal catalyst. According to investigations by the inventors of this invention, it has been determined that if the length of the ceria-containing first upper catalyst layer is 30 to 70% of the overall length of the base material, with the ceria-free second upper catalyst layer accounting for the remainder of the base material length, it is possible to obtain a catalyst that achieves good OSC performance and NOx purification performance, which are conflicting requirements.

As can be understood from the descriptions given above, the catalytic converter that is an aspect of this invention can provide a catalytic converter that is excellent in terms of OSC performance and NOx purification performance.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

An embodiment of the catalyst converter of this invention will now be explained with reference to the drawings.

First, a brief explanation will be given of a exhaust gas discharge system in which an embodiment of the catalyst converter of this invention is present. In the exhaust gas discharge system in which the embodiment of the catalyst converter of this invention is used, an engine, a catalytic converter, a three-way catalytic converter, a sub-muffler and a main muffler are connected via a system of pipes. Exhaust gas produced by the engine passes through the various components via the system of pipes and is then discharged.

Figure 1A:
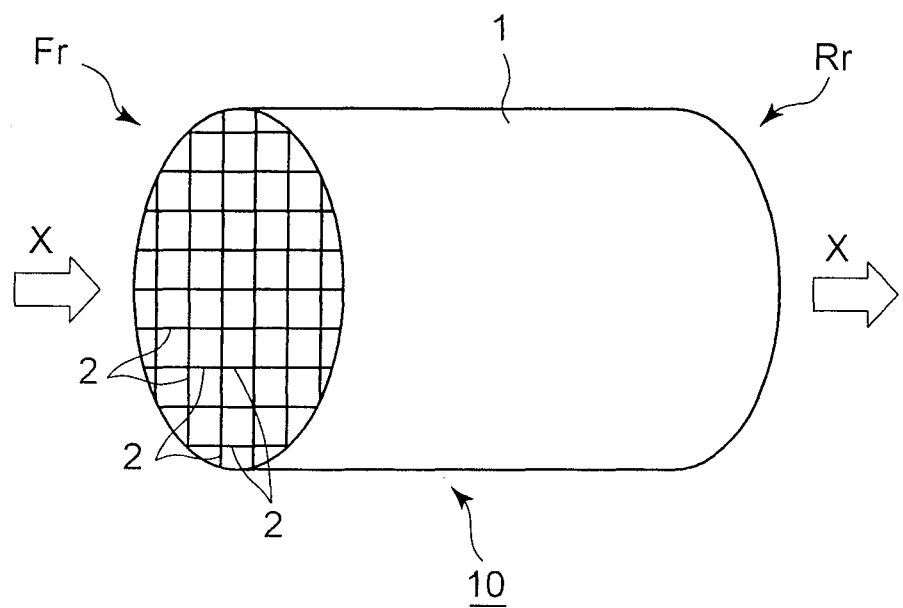
FIG. 1A is a schematic diagram of an embodiment of the catalytic converter of this invention.
Figure 1B:
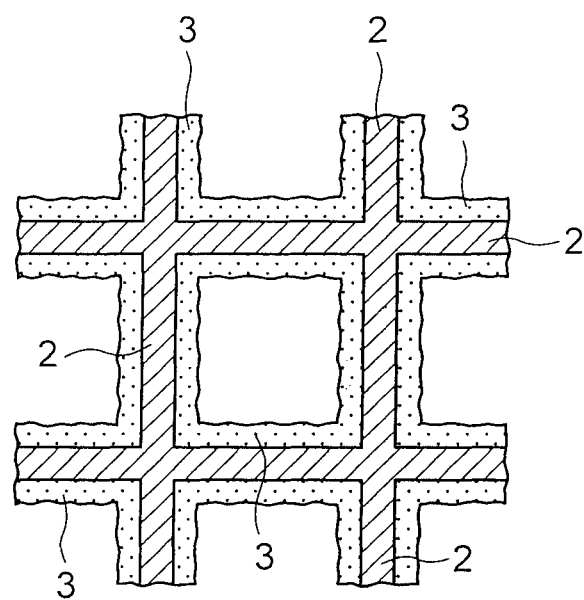
FIG. 1B is a diagram showing an enlargement of a part of a cell.
Figure 2A:
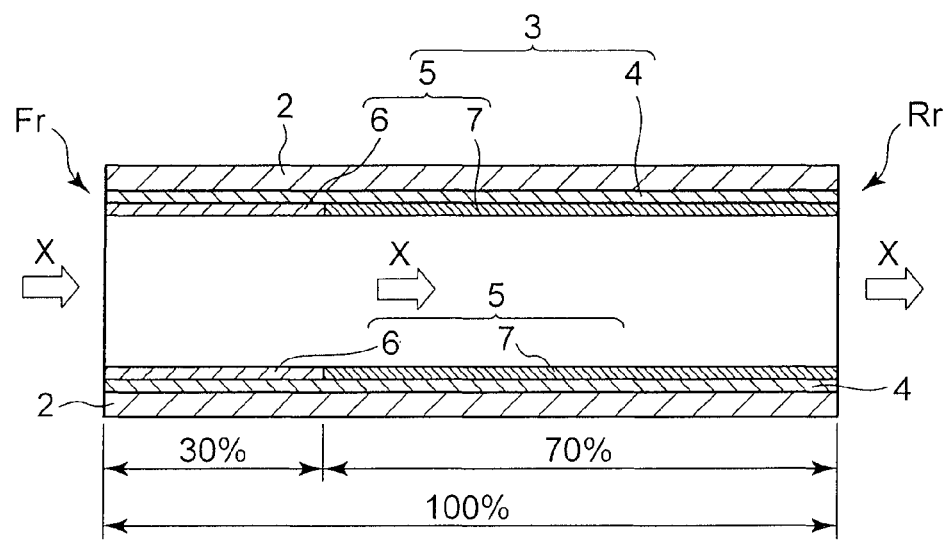
FIG. 2A and FIG. 2B are longitudinal cross sectional diagrams showing embodiments of a catalyst layer.
Figure 2B:
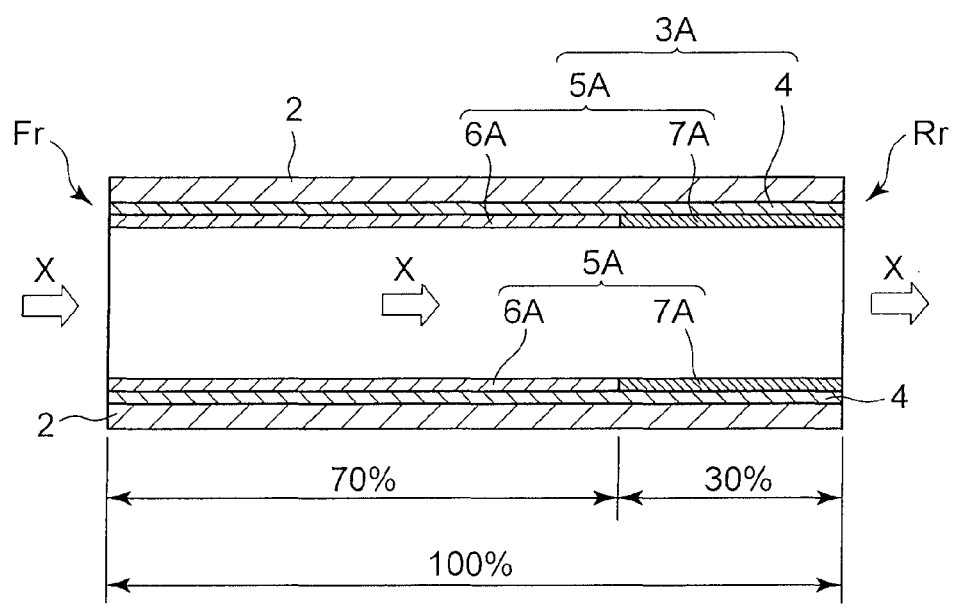

FIG. 1A is a schematic diagram of an embodiment of the catalytic converter of this invention, and FIG. 1B is a diagram showing an enlargement of a part of a cell. FIG. 2A and FIG. 2B are longitudinal cross sectional diagrams showing embodiments of a catalyst layer.

The catalytic converter 10 shown in FIG. 1A is constituted by a cylindrical base material 1 having a multiplicity of cells and a catalyst layer 3 formed on the surface of cell walls 2 that constitute the cells.

Here, the material of the base material 1 may be cordierite, which is a complex oxide of magnesium oxide, aluminum oxide and silicon dioxide, a ceramic material such as silicon carbide, or a material other than a ceramic, such as a metal material.

The base material 1 is a honeycomb structure provided with a multiplicity of cells having a grating profile that is tetragonal, hexagonal, octagonal, or the like. The exhaust gas that flows into the upstream side (Fr side) end cells of the base material 1 in the exhaust gas flow direction passes through the inner part of the base material 1 and is purified while being flowed, and the purified exhaust gas is discharged from the downstream side (Rr side) end of the base material 1 in the exhaust gas flow direction (the direction indicated by X).

An explanation will now be given of an embodiment of a catalyst layer, with reference to FIGS. 2A and 2B. The catalyst layer 3 shown in FIG. 2A is constituted by a lower catalyst layer 4 formed on the surface of the base material 1 and an upper catalyst layer 5 formed on the surface of the lower catalyst layer 4. The upper catalyst layer 5 is constituted by a first upper catalyst layer 6 on the upstream side in the exhaust gas flow direction and a second upper catalyst layer 7 on the downstream side in the exhaust gas flow direction. Therefore, the upper catalyst layer 5 is a zone-coated catalyst layer.

The lower catalyst layer 4 covers the entire length of the base material 1 and is formed by supporting palladium, which is a noble metal catalyst, on an oxide carrier.

Here, the oxide carrier that forms the lower catalyst layer 4 can be an oxide formed of one any of ceria ($CeO_2$), zirconia ($ZrO_2$) and alumina ($Al_2O_3$), or a complex oxide formed of two or more types of oxide (for example, a $CeO_2$—$ZrO_2$ compound that is a so-called CZ material or an $Al_2O_3$—$CeO_2$—$ZrO_2$ ternary complex oxide that contains $Al_2O_3$ as a diffusion barrier (an ACZ material)).

Meanwhile, the first upper catalyst layer 6 that constitutes the upper catalyst layer 5 in the aspect shown in FIG. 2A has a length corresponding to 30% of the overall length of the base material 1. The first upper catalyst layer 6 is formed by supporting rhodium, which is a noble metal catalyst, on an oxide carrier. In addition, the second upper catalyst layer 7 has a length corresponding to 70% of the overall length of the base material 1. The second upper catalyst layer 7 is formed by supporting rhodium, which is a noble metal catalyst, on an oxide carrier.

Here, the oxide carrier that forms the first upper catalyst layer 6 is a carrier that contains at least ceria ($CeO_2$), and can be an oxide that contains ceria ($CeO_2$) or a complex oxide that contains two or more metal oxides, such as ceria ($CeO_2$) and zirconia ($ZrO_2$) (for example, a $CeO_2$—$ZrO_2$ compound that is a so-called CZ material or an $Al_2O_3$—$CeO_2$—$ZrO_2$ ternary complex oxide that contains $Al_2O_3$ as a diffusion barrier (an ACZ material)).

Meanwhile, the oxide carrier that forms the second upper catalyst layer 7 is a carrier that does not contain ceria, and can be an oxide that contains at least one of zirconia ($ZrO_2$) and alumina ($Al_2O_3$), an $Al_2O_3$—$ZrO_2$ binary complex oxide (an AZ material), or the like.

By supporting rhodium on a ceria-containing carrier, high OSC performance can be achieved. However, there is a conflict whereby the NOx purification performance of rhodium deteriorates as the quantity of ceria in the carrier increases. With regard to this conflict, because a zone-coated configuration is used in the catalyst layer that contains ceria and the catalyst layer that does not contain ceria in the embodiment shown in the diagram, a catalyst layer that exhibits good OSC performance and good NOx purification performance is formed.

In an upper catalyst layer 5A that constitutes a catalyst layer 3A shown in FIG. 2B, the lengths of a first upper catalyst layer 6A and a second upper catalyst layer 7A are 70% and 30% respectively of the overall length of the base material 1, which is a reversal of the upper catalyst layer lengths used in the aspect shown in FIG. 2A.

As mentioned later, verifications by the inventors of this invention have determined that if the length of the first upper catalyst layer is 30 to 70% of the overall length of the base material 1 (and the length of the second upper catalyst layer is 70 to 30% of the overall length of the base material 1), a catalyst layer that exhibits good OSC performance and good NOx purification performance is formed.

Explanations will now be given of performance evaluation tests carried out using catalytic converters that are embodiments of this invention, tests to determine the optimal range for the coating width of the first upper catalyst layer, and the results of these tests. The inventors of this invention prepared catalyst slurries and catalytic converters by using the methods described below, evaluated the performance of the catalytic converters by carrying out endurance tests and engine bench tests, and determined the optimal range for the coating width of the first upper catalyst layer. 7 types of catalyst layer were produced in Working Examples 1 to 3 and Comparative Examples 1 to 4, which are shown in Table 1, and catalytic converters provided with these catalyst layers were produced and subjected to endurance tests. In addition, NOx quantities were measured under steady rich conditions, and oxygen storage quantities were also measured.

An explanation will now be given of the method for preparing the catalyst slurry. When preparing a slurry for forming a lower catalyst layer (a Pd catalyst layer), a powder supporting 1.0 mass % of catalyst was prepared by impregnating a carrier consisting of an $Al_2O_3$ complex oxide with a solution of palladium nitrate at a rate of 65 g/L. Next, a Pd catalyst slurry was obtained by mixing a $CeO_2$—$ZrO_2$ complex oxide ($CeO_2/ZrO_2/La_2O_3/Y_2O_3$=30/60/5/5 (mass %)) at a quantity corresponding to 85 g/L, barium acetate at a quantity corresponding to 10 g/L, and prescribed quantities of water, an $Al_2O_3$ binder, acetic acid, a thickening agent, and the like.

Meanwhile, when preparing a slurry for forming an upper catalyst layer (a Rh catalyst layer), slurries were compounded so as to contain 65 g/L of a $CeO_2$—$ZrO_2$ complex oxide ($Al_2O_3/CeO_2/ZrO_2/La_2O_3/Y_2O_3/Nd_2O_3=30/20/44/2/2/2$ (mass %)) and a $ZrO_2$ complex oxide ($Al_2O_3/ZrO_2/La_2O_3/Nd_2O_3=50/46/2/2$ (mass %)). In addition, Rh was supported at a quantity of 0.3 mass % on each carrier. Furthermore, a Rh catalyst slurry was obtained by mixing a La-containing $Al_2O_3$ at a quantity corresponding to 25 g/L, barium acetate at a quantity corresponding to 10 g/L, and prescribed quantities of water, an $Al_2O_3$ binder, acetic acid, a thickening agent, and the like. Moreover, in the catalyst layer in Comparative Example 3, a $CeO_2$—$ZrO_2$ complex oxide and a $ZrO_2$ complex oxide were mixed at a ratio of 1:1, but the overall quantity of oxide was the same as in the other comparative examples.

875 cc of a monolithic base material was prepared, and the slurries prepared as described above were coated on the base material using an aspiration method. The length of the Pd catalyst layer was 100% of the length of the base material and the lengths of the rhodium catalyst layers were as shown in Table 1 below.

TABLE 1

| | Length of upper catalyst layer (Fr/Rr) (%) | First upper catalyst layer carrier | Second upper catalyst layer carrier | Quantity (g) of $CeO_2$ in upper catalyst layer |
|---|---|---|---|---|
| Comparative Example 1 | 100/0 | AZLCNY | | 11.4 |
| Comparative Example 2 | 100/0 | AZLN | | 0 |
| Comparative Example 3 | 100/0 | AZLCNY + AZLN | | 5.7 |
| Working Example 1 | 50/50 | AZLCNY | AZLN | 5.7 |
| Comparative Example 4 | 50/50 | AZLN | AZLCNY | 5.7 |
| Working Example 2 | 30/70 | AZLCNY | AZLN | 3.4 |
| Working Example 3 | 70/30 | AZLCNY | AZLN | 8.0 |

Note:
AZLCNY denotes $Al_2O_3/CeO_2/ZrO_2/La_2O_3/Y_2O_3/Nd_2O_3$ and AZLN denotes $Al_2O_3/ZrO_2/La_2O_3/Y_2O_3/Nd_2O_3$.

An explanation will now be given of the endurance test. The obtained a catalytic converter was installed directly below an actual engine. The installed catalytic converter was subjected to an endurance test for 50 hours at a bed temperature of 1000° C. using a complex pattern in which the air-fuel ratio (A/F) was altered periodically.

An explanation will now be given of the engine bench test. Following the endurance test, the catalytic converter was installed in another actual engine, the A/F was varied between rich and lean in such a way that the A/F graph was rectangularly shaped, and when rich A/F conditions were maintained for 120 seconds, the purification performance was calculated as the average quantity of NOx discharged. The test results are shown in Table 2 and FIGS. 3 to 5 below.

TABLE 2

| | Rich NOx purification rate (%) | Oxygen storage quantity (g) |
|---|---|---|
| Comparative Example 1 | 92.4 | 0.32 |
| Comparative Example 2 | 99.2 | 0.12 |
| Comparative Example 3 | 94.8 | 0.24 |
| Working Example 1 | 97.2 | 0.29 |
| Comparative Example 4 | 97.0 | 0.26 |
| Working Example 2 | 97.9 | 0.21 |
| Working Example 3 | 95.4 | 0.31 |

Figure 3:
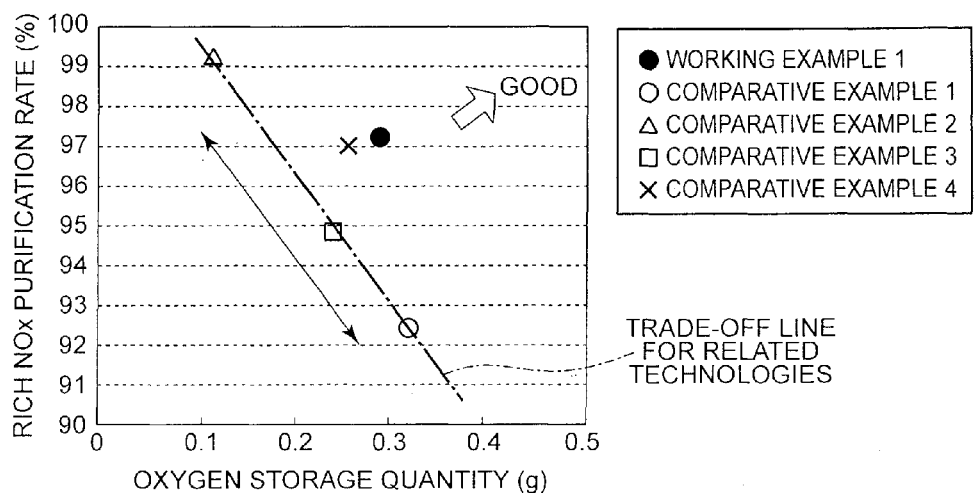
FIG. 3 is a graph showing experimental results that confirm the oxygen storage quantity and NOx purification rate of an embodiment of the catalytic converter of this invention.

In FIG. 3, the dotted and dashed line that passes through Comparative Examples 1 to 3 is the trade-off line for the related technologies. The dotted and dashed line that passes through Comparative Examples 1 to 3 indicates the tendency for the oxygen storage quantity to decrease as the NOx purification rate increases.

In FIG. 3, the result for Working Example 1 falls within a region where both oxygen storage quantity and NOx purification rate are better than the trade-off line. This is thought to be because Working Example 1 has a zone-coated upper catalyst layer.

Figure 4:
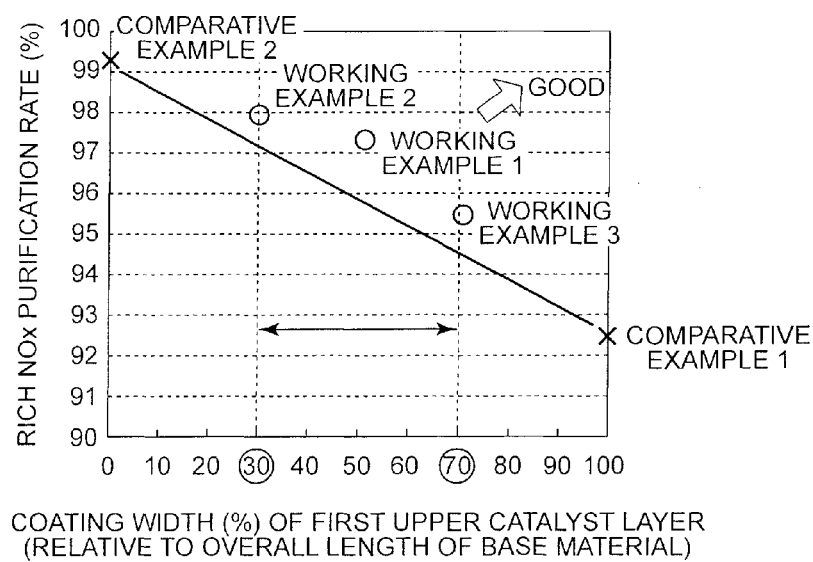
FIG. 4 is a graph showing experimental results prescribing the optimal numerical range for the catalyst coating width in the first upper catalyst layer from the perspective of NOx purification rate.
Figure 5:
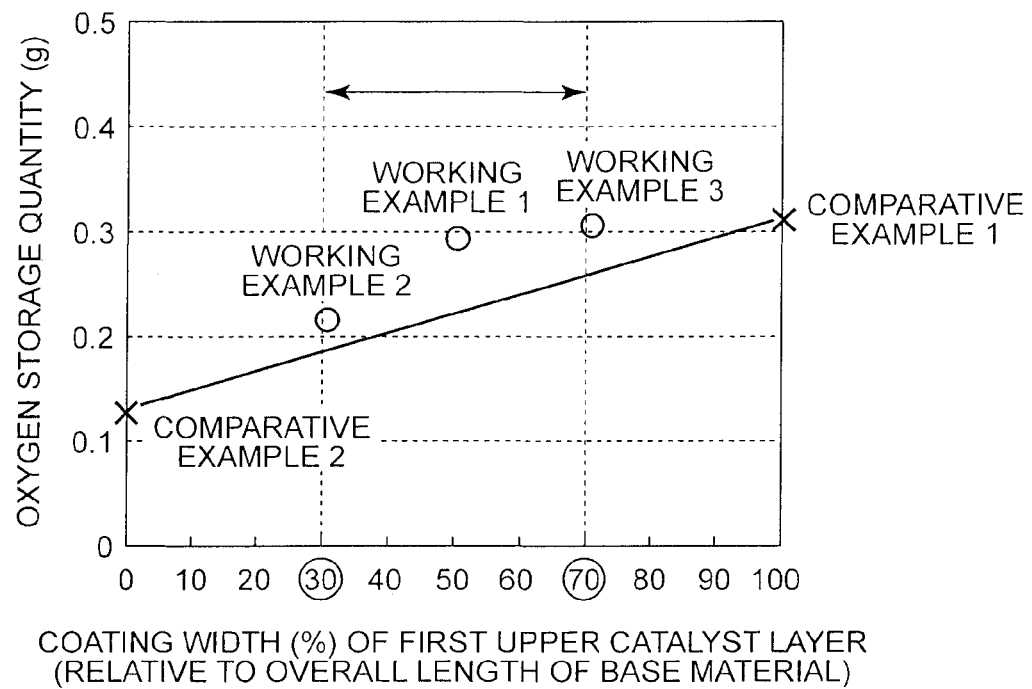
FIG. 5 is a graph showing experimental results prescribing the optimal numerical range for the catalyst coating width in the first upper catalyst layer from the perspective of oxygen storage quantity.

In addition, if the solid line that passes through Comparative Examples 1 and 2 is taken to be a threshold line in FIGS. 4 and 5, it can be seen that Working Examples 1 to 3 all achieve performance that is better than the threshold line.

In addition, it can be seen from FIGS. 4 and 5 that if the coating width of the first upper catalyst layer is 30 to 70%, a catalyst layer that exhibits excellent OSC performance and NOx purification performance is formed.

As mentioned above, the base material having a cellular structure may be cordierite, which is formed of a complex oxide of magnesium oxide, aluminum oxide and silicon dioxide, or a ceramic material such as silicon carbide. Alternatively, the base material having a cellular structure may be a material other than a ceramic, such as a metal material. In addition, the base material having a cellular structure may be a so-called honeycomb structure provided with a multiplicity of cells having a grating profile that is tetragonal, hexagonal, octagonal, or the like.

In addition, in the lower catalyst layer formed on the surface of the cell walls of the base material, an oxide formed of any one of ceria ($CeO_2$), zirconia ($ZrO_2$) and alumina ($Al_2O_3$), or a complex oxide formed of two or more types of oxide (for example, a $CeO_2$—$ZrO_2$ compound that is a so-called CZ material or an $Al_2O_3$—$CeO_2$—$ZrO_2$ ternary complex oxide that contains $Al_2O_3$ as a diffusion barrier (an ACZ material)) may be used as the carrier.

In addition, of the upper catalyst layers, an oxide formed of ceria ($CeO_2$) or a complex oxide that contains two or more metal oxides, such as ceria ($CeO_2$) and zirconia ($ZrO_2$) (for example, a $CeO_2$—$ZrO_2$ compound that is a so-called CZ material or an $Al_2O_3$—$CeO_2$—$ZrO_2$ ternary complex oxide that contains $Al_2O_3$ as a diffusion barrier (an ACZ material)) may be used as the carrier used in the first upper catalyst layer on the upstream side. In addition, an oxide that contains at least one of zirconia ($ZrO_2$) and alumina ($Al_2O_3$), an $Al_2O_3$—$ZrO_2$ binary complex oxide (an AZ material), or the like may be used as an oxide that does not contain ceria ($CeO_2$) in the carrier used in the second upper catalyst layer on the downstream side.

As mentioned above, the catalytic converter may preferably have a cordierite honeycomb carrier that exhibits excellent resistance to thermal shock. Alternatively, the catalytic converter may be an electrically heated catalytic converter (EHC). In this type of EHC, a honeycomb catalyst is heated by, for example, attaching a pair of electrodes to the honeycomb catalyst and passing an electric current between the electrodes. As a result, the activity of the honeycomb catalyst increases and exhaust gases that pass through the catalytic converter are efficiently detoxified. By using this type of EHC in an exhaust gas discharge system connected to a vehicle engine and a muffler, it is possible to purify exhaust gases at normal temperatures and also possible to purify exhaust gases by activating the catalyst in the cold by electric heating.

Embodiments of this invention have been described in detail above using the drawings, but the specific constitution of this invention is not limited to these embodiments. Design changes and the like that do not depart from the gist of this invention may be regarded as being encompassed by this invention.

The invention claimed is:

1. A catalytic converter comprising:
   a base material having a cellular structure through which exhaust gases flow; and
   a catalyst layer formed on a surface of a cell wall in the base material, wherein
   the catalyst layer has a lower catalyst layer and an upper catalyst layer,
   the lower catalyst layer is formed on a surface of the base material along an entire length of the base material,
   the upper catalyst layer is constituted by a first upper catalyst layer and a second upper catalyst layer,
   the first upper catalyst layer is formed on an upstream side of a surface of the lower catalyst layer in a direction of exhaust gas flow,
   an upstream side end of the base material is a starting point of the first upper catalyst layer,
   the second upper catalyst layer is formed on a downstream side of the surface of the lower catalyst layer in the direction of the exhaust gas flow,
   a downstream side end of the base material is a starting point of the second upper catalyst layer,
   the lower catalyst layer is formed of a carrier and palladium supported on the carrier,
   the first upper catalyst layer is formed of a first carrier and rhodium supported on the first carrier, the first carrier is formed of a complex oxide comprising $Al_2O_3$, $CeO_2$, $ZrO_2$, $La_2O_3$, $Y_2O_3$, and $Nd_2O_3$,
   the second upper catalyst layer is formed of a second carrier and rhodium supported on the second carrier, the second carrier being formed of a complex oxide comprising $Al_2O_3$, $ZrO_2$, $La_2O_3$, and $Nd_2O_3$,
   a length of the first upper catalyst layer in the direction of the exhaust gas flow is 30 to 70% of an overall length of the base material, and
   a length of the second upper catalyst layer in the direction of the exhaust gas flow is a length obtained by subtracting the length of the first upper catalyst layer from the overall length of the base material,
   wherein the first carrier is formed of a ceria-containing zirconia complex oxide, and the second carrier is formed of a zirconia complex oxide that does not contain ceria.

* * * * *